US008351449B1

United States Patent
Shmulevich et al.

(10) Patent No.: US 8,351,449 B1
(45) Date of Patent: Jan. 8, 2013

(54) SCHEDULING DATA COMMUNICATION FOR MOBILE COMMUNICATION DEVICES WITH MULTIPLE WIRELESS NETWORK INTERFACES ASSOCIATED WITH DIFFERING COSTS

(75) Inventors: Michael Shmulevich, Toronto (CA); Srinivasan Keshav, Waterloo (CA)

(73) Assignee: Bee Networx Inc., Vaughan, Ontario (CA)

( * ) Notice: Subject to any disclaimer, the term of this patent is extended or adjusted under 35 U.S.C. 154(b) by 336 days.

(21) Appl. No.: 12/775,441

(22) Filed: May 6, 2010

Related U.S. Application Data (63) Continuation of application No. 12/537,859, filed on Aug. 7, 2009, now abandoned.

(60) Provisional application No. 61/087,136, filed on Aug. 7, 2008.

(51) Int. Cl.
*H04L 12/28* (2006.01)
(52) U.S. Cl. .... 370/419; 370/229; 370/359; 370/395.21
(58) Field of Classification Search .................. 370/229, 370/230, 235, 238, 359, 392, 395.21, 395.4–395.43, 370/419
See application file for complete search history.

(56) References Cited

U.S. PATENT DOCUMENTS

| | | | | |
|---|---|---|---|---|
| 6,205,150 | B1 * | 3/2001 | Ruszczyk | 370/412 |
| 7,093,256 | B2 * | 8/2006 | Bloks | 718/102 |
| 7,457,243 | B2 * | 11/2008 | Meggers et al. | 370/230 |
| 7,751,317 | B2 * | 7/2010 | Toyama et al. | 370/230 |
| 8,009,688 | B2 * | 8/2011 | Welin | 370/412 |
| 2008/0062881 | A1 * | 3/2008 | Martin et al. | 370/238 |
| 2008/0117810 | A1 * | 5/2008 | Stott et al. | 370/230 |
| 2008/0165770 | A1 * | 7/2008 | Shin et al. | 370/389 |
| 2008/0192665 | A1 * | 8/2008 | Tao et al. | 370/311 |
| 2009/0249350 | A1 * | 10/2009 | Senders et al. | 718/104 |
| 2011/0085464 | A1 * | 4/2011 | Nordmark et al. | 370/252 |

* cited by examiner

*Primary Examiner* — Kwang B Yao
*Assistant Examiner* — Nguyen Ngo
(74) *Attorney, Agent, or Firm* — Brill Law Office; Jeffrey Brill (57) ABSTRACT

A mobile communication device has both an (expensive) long-range wireless network interface and an intermittently available less expensive network interface. Requests are received to communicate data items to and from remote computing devices. Each data item is associated with a transmission deadline and an urgency rating. A transmission schedule is created by assigning data items to specific times for transmission over the long-range wireless network interface, based on their deadlines and urgency ratings. When the lower cost network interface is not available, data items are transmitted according to the transmission schedule. When the lower cost network interface is available, data items are transmitted over the lower cost network interface, based on their positions in the transmission schedule, until it is no longer available.

18 Claims, 4 Drawing Sheets

SCHEDULING DATA COMMUNICATION FOR MOBILE COMMUNICATION DEVICES WITH MULTIPLE WIRELESS NETWORK INTERFACES ASSOCIATED WITH DIFFERING COSTS

PRIORITY CLAIM

This patent application is a Continuation of commonly assigned patent application Ser. No. 12/537,859, filed on Aug. 7, 2009 now abandoned, titled "Scheduling Data Communication for Mobile Communication Devices with Multiple Wireless Network Interfaces Associated with Differing Costs" (the "Parent Application"). This patent application claims the benefit of the earlier filing date of the Parent Application, which in turn claims the benefit of provisional application Ser. No. 61/087,136, titled "Scheduling of Data Transmission and Reception on Mobile Devices with Wireless Network Interfaces Associated with Differing Costs," filed on Aug. 7, 2008 ("the Provisional Application"). The entirety of the Provisional Application is hereby incorporated by reference.

TECHNICAL FIELD

This disclosure pertains generally to mobile communication devices, and more specifically to scheduling data communication for mobile communication devices with multiple wireless network interfaces associated with differing costs.

BACKGROUND

The use of highly-capable mobile communication devices such as the iPhone®, the BlackBerry® and the Treo® is increasing rapidly. Such devices often transmit and receive large amounts of data such as video and audio clips, photographs and email attachments. Although contemporary mobile communication devices are capable of creating and utilizing these types of media content, they do not intelligently use the communication media available to them to optimize transmission and receipt of media files. Instead, mobile communication devices tend to immediately send or receive data, insensitive to the cost charged by operators, the type of service currently available or the remaining battery life. This can result not only in large bills for consumers, but also in the rapid loss of battery life, making the device useless until it is recharged. These problems are exacerbated by factors such as the proliferation of connectivity options, the wide variations in carrier data plans and treatment of device roaming, transient appearance and disappearance of short-range wireless connectivity and the need to balance user expectations and device capabilities.

Contemporary mobile communication devices typically have more than one wireless network interface. Many contemporary mobile communication devices have one or more short-range wireless interfaces (e.g., WiFi, Bluetooth) and one or more long-range wireless interfaces (e.g., a cellular interface such as GPRS, EDGE, 3G). Additionally, mobile communication devices can be docked, in which case wired connectivity is available. Importantly, these different network interfaces vary widely in coverage, cost, and capability. For example, WiFi has limited coverage, low cost, and high capacity. In contrast, GPRS has extensive coverage, high cost, and low capacity.

Additionally, users of mobile communication devices tend to use a wide range of applications. Unlike traditional mobile phones that only support voice and limited text-based applications, the mobile communication device users of today run applications that utilize rich multimedia content such as video, which requires the processing and transmission of large amounts of data. Importantly, some applications are more delay-tolerant than others. For example, some business emails are extremely urgent, whereas data transmissions associated with entertainment applications can be less so.

There is a wide range of desired functionalities and resource requirements among different users and applications, as well as a corresponding diversity of cost and capability between different network interfaces. Yet, mobile applications typically neither schedule data communication nor make intelligent choices between multiple network interfaces. The rare application that does schedule its data communication focuses only on delivering performance levels acceptable to that application in isolation. There is no coordination and scheduling of connectivity at the mobile communication device level to account for divergent needs of different applications running simultaneously. This limits the performance of the mobile communication device and the applications deployed thereon. It also forces application vendors to incur costs for developing scheduling algorithms for their specific applications. Additionally, it exposes users of mobile communication devices to unnecessary usage costs, because data could potentially be sent on less expensive network interfaces than the ones selected by application designers. It would be desirable to address these shortcomings.

SUMMARY

A mobile communication device has one or more long-range wireless network interfaces and one or more intermit lower cost network interfaces. The long-range wireless network interface is typically available, but is more expensive to use. The intermittent lower cost network interface is less expensive to use, but is often not available. A mobile communication scheduler schedules data communication for the mobile communication device so as to use the less expensive network interface when it is available, but to use the more expensive network interface to the extent necessary to avoid missing transmission deadlines. The mobile communication scheduler receives requests to communicate data items between the mobile communicate device and remote computing devices. Each data item is associated with a deadline and an urgency rating. The mobile communication scheduler creates a transmission schedule by assigning data items to specific times for transmission over the (expensive) long-range wireless network interface, based on the deadlines and urgency ratings of the data items. When the intermittent lower cost network interface is not available, data items are communicated between the mobile communication device and remote computing devices according to the transmission schedule, such that no data item is transmitted prior to its assigned time. When the intermittent lower cost network interface is available, data items are transmitted over the intermittent lower cost network interface, based on their positions in the transmission schedule, until the intermittent lower cost network interface is no longer available. When the intermittent lower cost network interface is available, data items are transmitted over the lower cost network interface, regardless of whether or not their assigned times have occurred.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
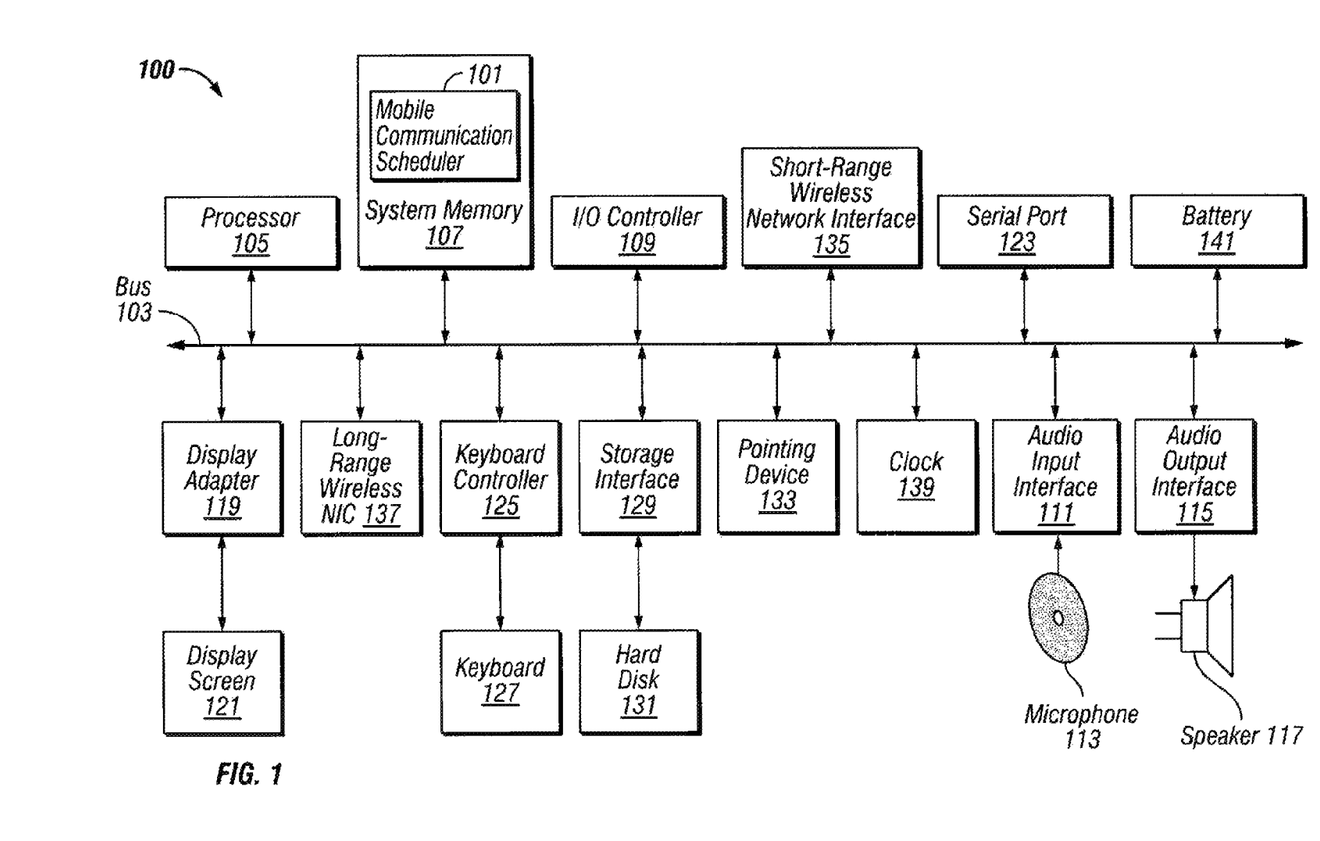
FIG. 1 is a block diagram of a computing device suitable for implementing a mobile communication scheduler, according to some embodiments.

FIG. 1 is a block diagram of a computing device 100 suitable for implementing a mobile communication scheduler 101. In some embodiments, the computing device 100 comprises a mobile communication device 200. As used herein the term "mobile communication device 200" means a battery 141 powered computing device 100 with network access that can be practicably moved between and used in different physical locations. Examples of mobile communication devices 200 include but are not limited to, smartphones, personal digital assistants, netbook computers, laptop computers, etc. In other embodiments, the computing device 100 does not comprise a mobile communication device 200, but is instead stationary in nature (e.g., a desktop computer).

As illustrated, one component of the computing device 100 is a bus 103. The bus 103 communicatively couples other components of the computing device 100, such as at least one processor 105, system memory 107 (e.g., random access memory (RAM), read-only memory (ROM), flash memory), an input/output (I/O) controller 109, an audio input interface 111 communicatively coupled to an audio input device 113 such as a microphone, an audio output interface 115 communicatively coupled to an audio output device 117 such as a speaker, a display adapter 119 communicatively coupled to a video output device such as a display screen 121, one or more interfaces 123 such as serial ports, Universal Serial Bus (USB) receptacles, etc., a keyboard controller 125 communicatively coupled to a keyboard 127, a storage interface 129 communicatively coupled to at least one hard disk 131 (or other form(s) of magnetic, optical and/or other type of storage media), a pointing device 133 coupled to the bus 103, a short-range wireless (e.g. WiFi, Bluetooth) network interface card (NIC) 135 or other form of short-range wireless interface, coupled, e.g., directly to the bus 103, a long-range wireless NIC 137 (e.g., GPRS, EDGE, WiMax, etc.), one or more other types of NICs 138 or similar (e.g., for interfacing with network types such as wired, etc.) and a rechargeable power source such as a battery 141. All of the components illustrated in FIG. 1 need not be present. Furthermore, the components can be interconnected in different ways from that shown in FIG. 1.

The bus 103 allows data communication between the processor 105 and system memory 107, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., magnetic or optical disk 131) and loaded into system memory 107 and executed by the processor 105. Application programs can also be loaded into system memory 107 from a remote location (i.e., a remotely located computing device 100), for example via a NIC 135. In FIG. 1, the mobile communication scheduler 101 is illustrated as residing in system memory 107. The workings of the mobile communication scheduler 101 are explained in greater detail below in conjunction with FIGS. 2 and 3.

The storage interface 129 is coupled to one or more hard disks 131 (and/or other storage media). The network interface(s) 135, 137 can be directly or indirectly communicatively coupled to a network such as the Internet. Such coupling can be wired or wireless.

Figure 2:
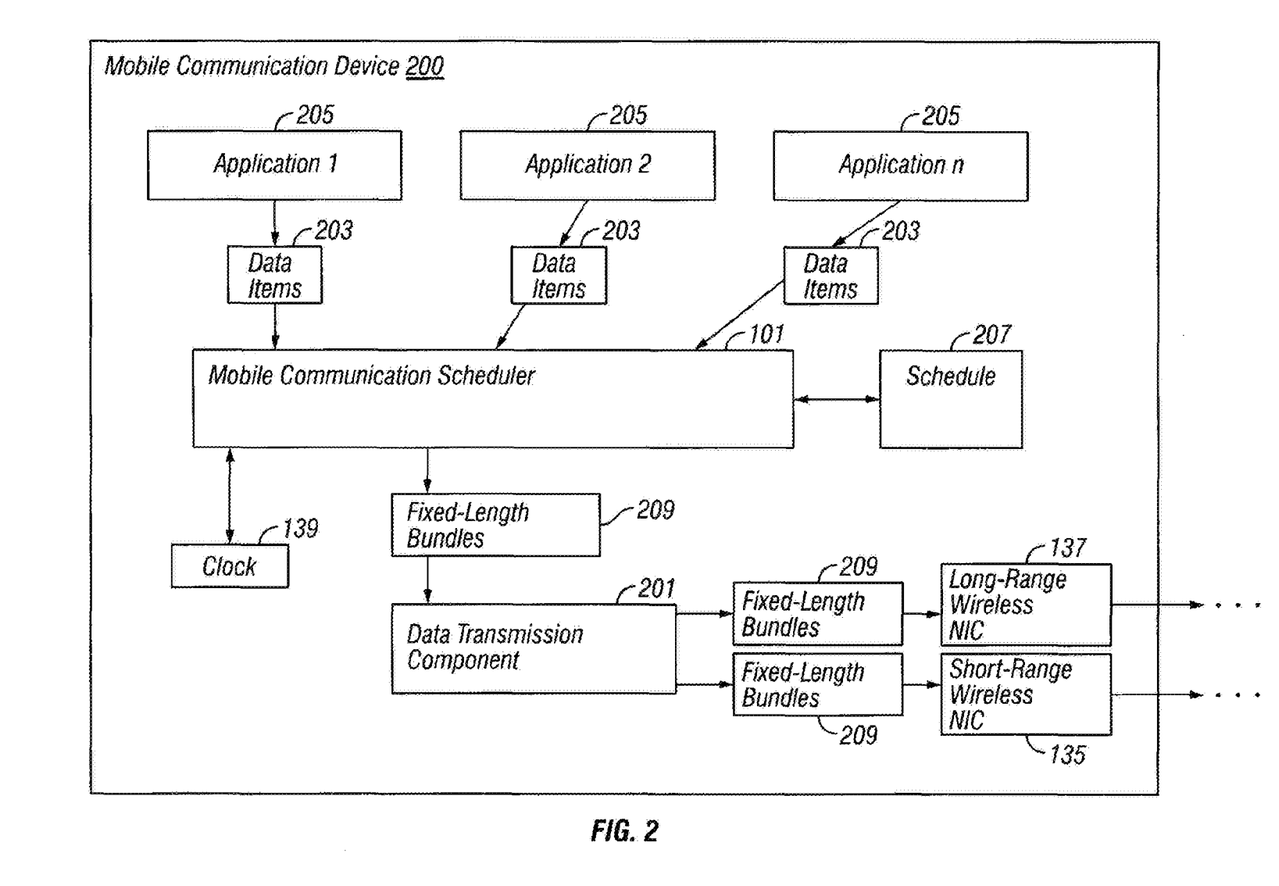
FIG. 2 is a block diagram illustrating the operations of a mobile communication scheduler running on a mobile communication device, according to some embodiments.

FIG. 2 illustrates a mobile communication scheduler 101, according to some embodiments. The mobile communication scheduler 101 is illustrated as residing on a mobile communication device 200. It is to be understood that an instance of the mobile communication scheduler 101 can also run on a proxy computing device 300, as described below in conjunction with FIG. 3. It is to be understood that although the mobile communication scheduler 101 is illustrated in FIG. 2 as a separate entity, the illustrated mobile communication scheduler 101 represents a collection of functionalities, which can be instantiated as fewer, more or overlapping components as desired. It is to be understood that the components of the mobile communication scheduler 101 can be instantiated (for example as object code or executable images) within the system memory 107 (e.g., RAM, ROM, flash memory) of a mobile communication device 200 (or other type of computing device 100), such that when the processor 105 of the mobile communication device 200 processes a component, the mobile communication device 200 executes the associated functionality. Additionally, program code to implement the functionalities of the mobile communication scheduler 101 can be stored on computer-readable storage media, such that the program code can be loaded from the computer-readable storage media into the system memory 107 of a mobile communication device 200 (or other type of computing device 100), and executed by its processor 105. Any form of tangible computer readable storage medium can be used in this context, such as magnetic or optical storage media. As used herein, the term "computer readable storage medium" does not mean an electrical signal separate from an underlying physical medium. As used herein, the terms "computer system," "computer," and "computing device" mean one or more computers configured and/or programmed to execute the described functionality.

The instance of the mobile communication scheduler 101 running on the mobile communication device 200 schedules the transmission of data items 203 from the mobile communication device 200 to remote computing devices 100. In creating a transmission schedule 207, the mobile communication scheduler 101 takes into account the difference in cost of use between connectivity options, the deadlines by which to transit the data items 203 and the priority rating (i.e., importance) associated with each data item 203. Long-range wireless connectivity (e.g., GPRS, EDGE) is expensive to use, but can be assumed to always be available. Intermittent lower cost connectivity (e.g., short-range wireless connectivity such as WiFi or Bluetooth, wired connectivity, etc.) is cheap to use, but are not always available.

Given data items 203 to transmit, the mobile communication scheduler 101 assumes that the long-range wireless NIC 137 is always available, and works backwards from the deadline, allocating data items 203 to time slots, while taking priorities into account (as described in detail below). Moreover, when less expensive connectivity (e.g., WiFi, wired) becomes available, the mobile communication scheduler 101 works forwards from the current time, processing data items 203 even if associated deadlines have not yet occurred. That way, cheap connectivity is used when possible, but deadlines are met to the extent feasible.

As illustrated in FIG. 2, in addition to the mobile communication scheduler 101, also present on the mobile communication device 200 are a data transmission component 201, at least one intermittent lower cost NIC 135 (for example, a short-range wireless NIC 135, as illustrated), at least one long-range wireless NIC 137, a clock 139, and a plurality of applications 205. Each application 205 running on the mobile communication device 200 wants to transmit data items 203 by specific deadlines.

Each data item 203 is associated with an urgency rating, and a deadline by which it is to be transmitted. In one embodiment, a user of the mobile communication device 200 or an administrator of the deployment assigns an urgency rating of urgent or non-urgent to each data item 203 to be transmitted. Urgency ratings can come from other sources in other embodiments. In some embodiments, data items 201 to be transmitted are rated according to additional levels of urgency (e.g., non-urgent, urgent, very urgent, extremely urgent). In one embodiment, the deadlines are assigned to data items 203 by the specific transmitting application 205. Deadlines can also originate from other sources, such as users or administrators. A data item 203 with a higher priority rating takes precedence over one with a lower priority rating.

The mobile communication scheduler 101 schedules data items 203 for transmission, and outputs a transmission schedule 207 that assigns each data item 203 to a time at which it is scheduled to be transmitted over a long-range wireless (expensive) NIC 137. More specifically, the mobile communication scheduler 101 divides each data item 203 into fixed-length bundles 209, and assigns each bundle 209 to a specific time slot for transmission. In some embodiments, a bundle 209 size of 16 KB is used, although other sizes are used in other embodiments as desired. Typically, the last bundle 209 of a data item 203 is padded to make it fit the fixed size.

For the sake of creating the transmission schedule 207, the mobile communication scheduler 101 assumes that it takes a given amount of time to transmit a (fixed size) bundle 209 on the long-range wireless NIC 137. The mobile communication scheduler 101 sets the value to use in this capacity to the lowest reasonably anticipated bandwidth for the given long-range wireless technology. For example, the mobile communication scheduler 101 could use a value of 8 kbps for GPRS, and a value of 25 kbps for EDGE. The exact value to use for a given technology is a variable design parameter. The mobile communication scheduler 101 utilizes this value when assigning bundles 209 to times slots. The mobile communication scheduler 101 can therefore be reasonably certain that the transmission of each bundle 209 will complete within its single, allocated time slot.

In one embodiment, rather than assume that the long-range wireless NIC 137 will always be available, the mobile communication scheduler 101 adds a stretch factor to the length of each time slot, to account for projected downtime of long-range wireless NIC 137. In one embodiment, the stretch factor is computed as the inverse of the projected availability of the technology. Thus, for example, for technology available 95% (0.95) of the time, the stretch factor would be 1.05, whereas for technology available 50% (0.5) of the time, the stretch factor would be 2.0.

In one embodiment, the mobile communication scheduler 101 applies the following formula to assign each bundle 209 of a data item 203 to a time slot. Let B refer to the bundle 209 currently being scheduled. B is initially set to the last bundle 209 of the current data item 203. 1) The mobile communication scheduler 101 tries to assign B to the time slot just before its deadline (so that the bundle 209 completes transmission by the deadline). 2) If this slot (call it S) is available, the mobile communication scheduler 101 assigns B to S. The mobile communication scheduler 101 is now done with B, and sets B to the next-to-last bundle 209 of the current data item 203 (if that exists) and repeats step 1. If B is the first bundle 209 of the current data item 203, the data item 203 is scheduled, and the mobile communication scheduler 101 attempts to schedule the next data item 203, if there is one. 3.) If another bundle (call it B') is already assigned to S, the mobile communication scheduler 101 compares the priority rating of B' to the priority rating of B. 4) If B' has a lower priority rating than B, then the mobile communication scheduler 101 leaves B' in place, and attempts to assign B to slot S−1 (i.e., one slot before S) by executing step 2. 5) If B' has a higher priority rating than B, the mobile communication scheduler 101 assigns B to S. Then the mobile communication scheduler 101 attempts to assign B' to S−1 by executing step 2. 6.) If steps 4 or 5 result in attempting to assign a given bundle 209 to a slot to which another bundle 209 is already assigned, the mobile communication scheduler 101 repeats steps 3-5 until the given bundle 209 is assigned to a slot. 7.) If the mobile communication scheduler 101 cannot assign all the bundles 209 of a data item 203, then it returns an error indicating that the current data item 203 cannot be safely scheduled.

Example pseudo-code for this process is illustrated in Table 1 below.

TABLE 1

```
s = slot just before the data item's deadline
for (i=0; i < number of bundles in data item; i++)
    place(data_item[last-i], s)
function place (b, s){
    if s is free
        schedule[s] = b;
        return;
    else {
        if (s==next time slot after now)
            return ERROR;
        if priority of schedule[s] > b.priority
            b' = schedule[s]
            schedule[s] = b
            place(b', s-1);
        else // schedule has lower priority
            place(b, s-1)
    }
}
```

Minor variations to this formula can be applied in other embodiments, provided that the bundles 209 are assigned to time slots based on their associated priority ratings and deadlines. The implementation logistics of minor scheduling variations within this context will be readily apparent to those of ordinary skill in the relevant art in light of this specification.

Once a transmission schedule 207 has been created, the data transmission component 201 processes actual transmission of bundles 209 over the expensive and inexpensive interfaces as follows. The data transmission component 201 detects when at least one intermittent lower cost NIC 135 is and is not available. So long as no intermittent lower cost NIC 135 is available, the data transmission component 201 transmits bundles 209 over the long-range wireless NIC 137 with the lowest use cost according to the transmission schedule 207. Note that the least-cost long-range wireless NIC 137 is still more expensive to use than an intermittent lower cost NIC 135. To transmit the bundles 209 over a long-range wireless NIC 137, the data transmission component 201 uses the clock 139 to monitor the current time, and compares the current time to time slots in the transmission schedule 207. If nothing is assigned to be transmitted at the current time, the long-range wireless NIC 137 is idle. Otherwise, the data transmission component 201 transmits the bundle 209 assigned to the current time slot over the long-range wireless NIC 137. Note that under this system, no bundle 209 is transmitted over the long-range wireless NIC 137 ahead of its assigned time slot in the transmission schedule 207.

During such times when at least one intermittent lower cost NIC 135 is available, the data transmission component 201 transmits as many bundles 209 as possible over the intermittent lower cost NIC 135 with the lowest use cost available. The data transmission component 201 transmits these bundles 209 in order of their position in the transmission schedule 207, even if their scheduled time slot has not yet occurred, for as long as the intermittent lower cost NIC 135 is available. Note that this results in using less expensive connectivity whenever it is available. A given bundle 209 in the transmission schedule 209 may already have been transmitted over a long-range wireless NIC 137 by the time its turn to be transmitted on the available intermittent lower cost NIC 135 occurs. Such bundles 209 are simply ignored.

In one embodiment, the data transmission component 201 further detects when the mobile communication device 200 is physically connected to a wired network (e.g., the mobile communication device 200 is docked to another computing device 100 with a wired network connection). In this embodiment, when the data transmission component 201 detects that a wired network connection is available, it transmits as many bundles 209 over the wired connection as possible, in order of their position in the transmission schedule 207, even if their scheduled time slot has not yet occurred, for as long as the wired network connection is available. Because wired network connections are typically less expensive to use and faster than even a short-range wireless ones, it is desirable to use the wired connection to process as much network traffic as possible when it is available.

In general, it is to be understood that the above-described methodology can be applied to any number of network interfaces of varying transmission cost and availability. When an intermittent lower cost NIC 135 is available, the data transmission component 201 utilizes the intermittent lower cost NIC 135 as described above. In the case of more than one intermittent lower cost NIC 135 being simultaneously available (e.g., short-range wireless and wired), the data transmission component 201 utilizes the less expensive one. When no intermittent lower cost NICs 135 are available, the data transmission component 201 utilizes the least expensive currently available long-range wireless NIC 137, if necessary to meet a transmission deadline, as described above. It is to be understood that "intermittent lower cost network interface" means herein a network interface that is not always available, and is of a lower cost to use relative to another network interface that is typically more frequently available.

Figure 3:
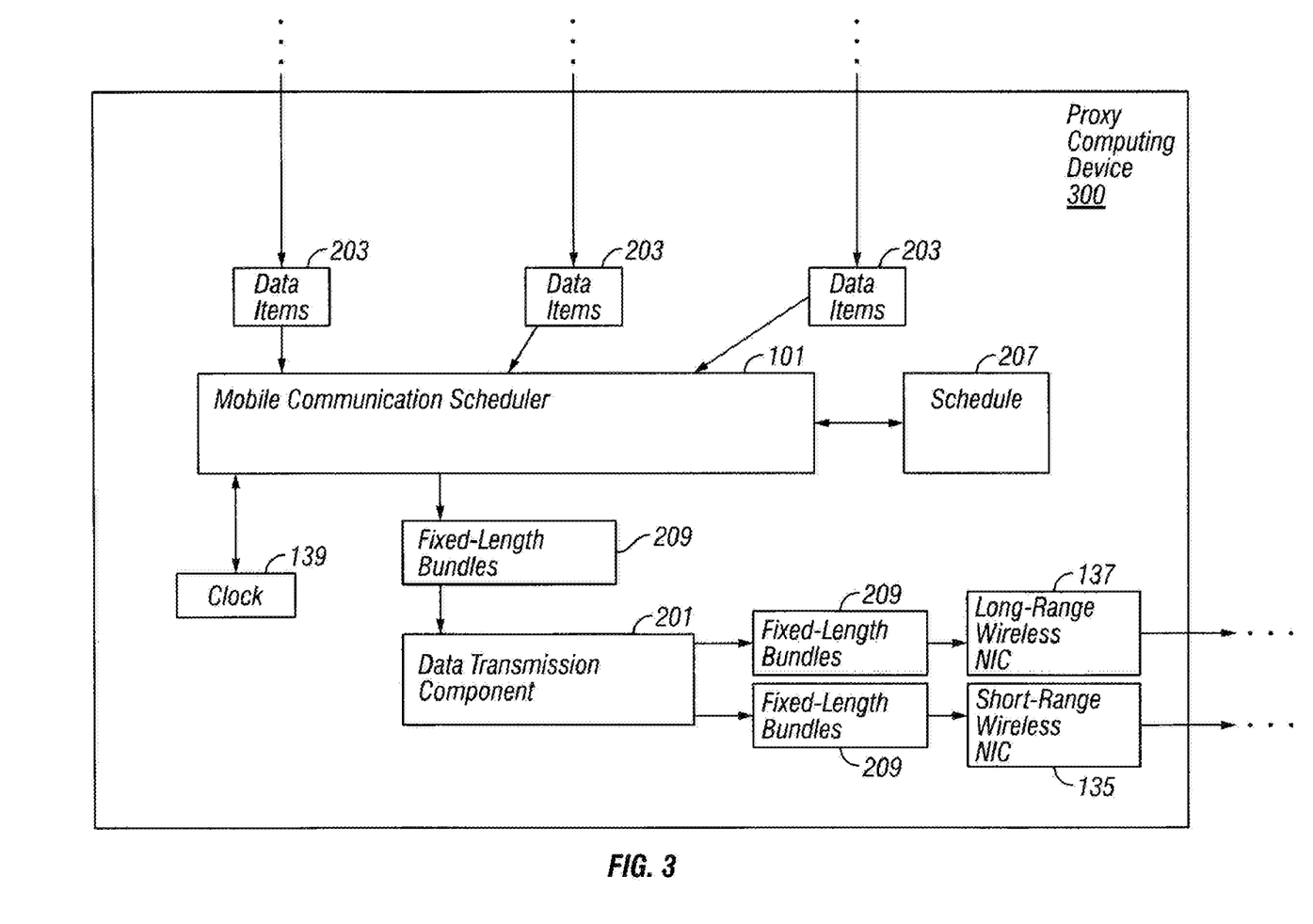
FIG. 3 is a block diagram illustrating the operations of a mobile communication scheduler running on a proxy computing device, according to some embodiments.

As illustrated in FIG. 3, in some embodiments an instance of the mobile communication scheduler 101 also runs on a proxy computing device 300, and uses symmetric logic to schedule data items 201 being transmitted to the mobile communication device 200 from remote computing devices 100. Also present on the proxy computing device 300 are a data transmission component 201, an intermittent lower cost NIC 135, a long-range wireless NIC 137 and a clock 139.

Standard techniques are used to ensure that data items 203 being transmitted to the mobile communication device 200 are received by the proxy computing device 300. Such techniques are known to those of ordinary skill in the relevant art, and the implementation mechanics thereof within the described context will be readily apparent to those of such a skill level in light of this specification. When the mobile communication device 200 has access to intermittent lower cost communication (e.g., short-range wireless and/or wired), the instance of the mobile communication scheduler 101 running on the mobile communication device 200 so informs the instance of the mobile communication scheduler 101 running on the proxy computing device 300. The mobile communication scheduler 101 running on the proxy computing device 300 assumes that long-range wireless communication is always available.

The mobile communication scheduler 101 running on the proxy computing device 300 receives data items 203 from remote computing devices 100 for transmission to the mobile communication device 200. Urgency ratings and deadlines are assigned to these data items 203, in a manner similar to that described above in conjunction with FIG. 2. In different embodiments, the urgency ratings and/or deadlines can originate from users, administrators of the deployment, applications and/or other sources.

The mobile communication scheduler 101 running on the proxy computing device 300 applies the functionality described above in conjunction with FIG. 2 to create a transmission schedule 207, taking into account the difference in cost of use between connectivity options, the deadlines by which to transit the data items 203 and the priority rating (i.e., importance) associated with each data item 203.

Once a transmission schedule 207 has been created, the data transmission component 201 running on the proxy computing device 300 processes the actual transmission of bundles 209 of the data items 203 over the expensive and inexpensive interfaces, using the functionality described above in conjunction with FIG. 2.

It is to be understood that for readability and ease of understanding, the present specification frequently refers to intermittent lower cost NICs 135 and long-range wireless NICs 137. In some embodiments, other types of intermittent lower cost and/or long-range wireless interfaces are used.

Figure 4:
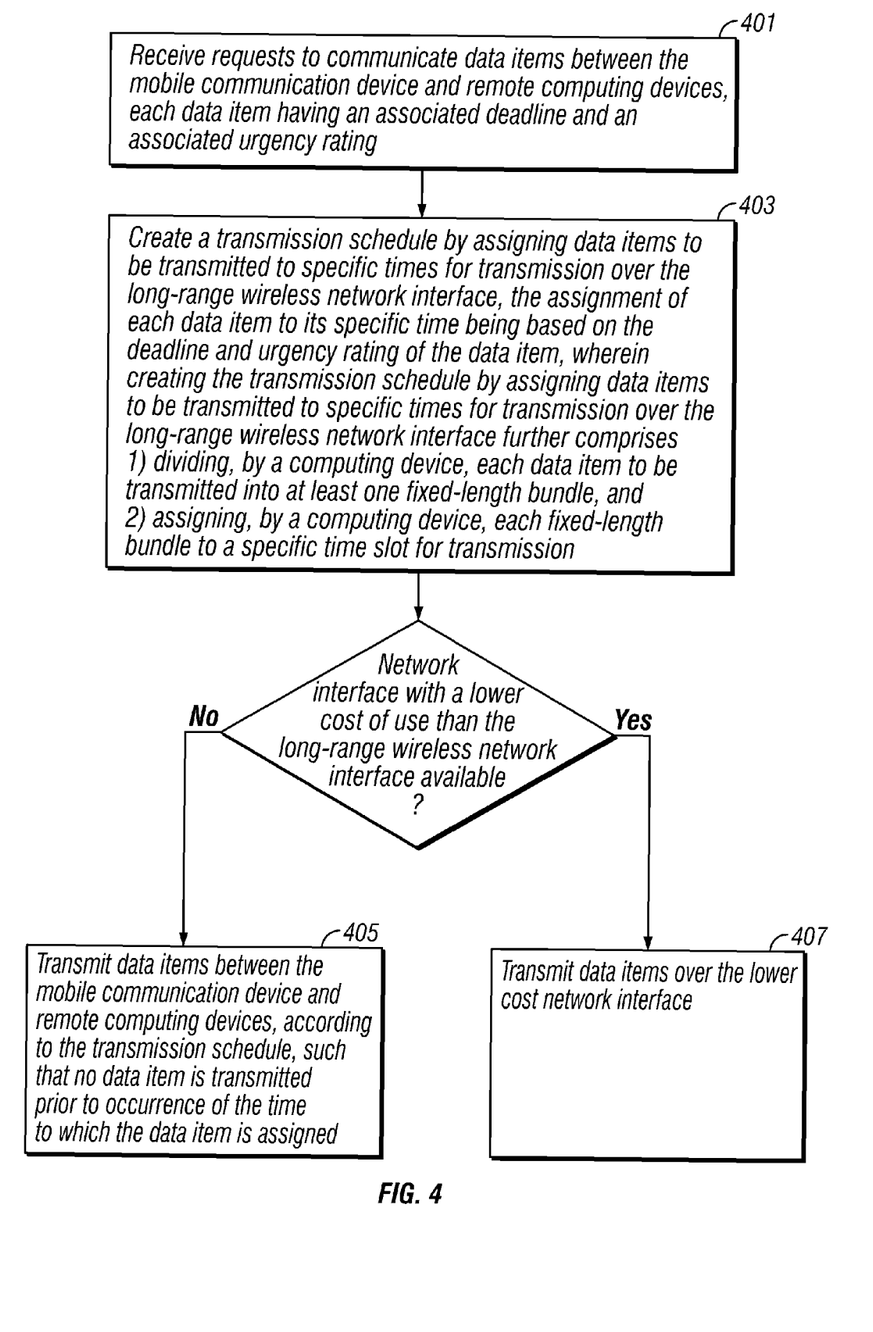
FIG. 4 is a flowchart illustrating steps for the operation of a mobile communication scheduler, according to some embodiments.

FIG. 4 is a flowchart illustrating steps for the operation of a mobile communication scheduler, according to some embodiments.

As will be understood by those familiar with the art, the claimed subject matter may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the claimed subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for scheduling data communications for a mobile communication device with at least one intermittent lower cost network interface and at least one long-range wireless network interface, the method comprising:

receiving, by a computing device, requests to communicate data items between the mobile communication device and remote computing devices, each data item having an associated deadline and an associated urgency rating;

creating a transmission schedule by assigning data items to be transmitted, by a computing device, to specific times for transmission over the long-range wireless network interface, the assignment of each data item to its specific time being based on the deadline and urgency rating of the data item, wherein creating the transmission schedule by assigning data items to be transmitted to specific times for transmission over the long-range wireless network interface further comprises 1) dividing, by a computing device, each data item to be transmitted into at least one fixed-length bundle, and 2) assigning, by a computing device, each fixed-length bundle to a specific time slot for transmission;

responsive to no network interface with a lower cost of use than the long-range wireless network interface being available, transmitting, by a computing device, data items between the mobile communication device and remote computing devices, according to the transmission schedule, such that no data item is transmitted prior to occurrence of the time to which the data item is assigned; and responsive to a network interface with a lower cost of use than the long-range wireless network interface being available, transmitting, by a computing device, data items over the lower cost network interface.

2. The method of claim 1 wherein transmitting a data item, by a computing device, further comprises performing at least one step from a group of steps consisting of:

transmitting, by the mobile communication device, a data item from the mobile communication device to a remote computing device; and transmitting, by a proxy computing device, a data item originating from a remote computing device from the proxy computing device to the mobile communication device.

3. The method of claim 1 wherein dividing, by a computing device, each data item to be transmitted into at least one fixed-length bundle further comprises:

dividing, by a computing device, at least one data item to be transmitted into a plurality of fixed-length bundles; and padding, by a communication device, a last one of the plurality of fixed-length bundles, such that the last one of the plurality of fixed-length bundles conforms to the fixed-length.

4. The method of claim 1 wherein creating a transmission schedule by assigning data items to be transmitted, by a computing device, to specific times for transmission over the long-range wireless network interface, the assignment of each data item to its specific time being based on the deadline and urgency rating of the data item further comprises:

assuming, by a computing device, a specific maximum amount of transmission time to transmit a fixed-length bundle on the long-range wireless network interface; and assigning, by a computing device, each fixed-length bundle to a specific time slot for transmission according to the assumed, specific maximum amount of transmission time, thereby ensuring that the transmission of each fixed-sized bundle completes within is time slot.

5. The method of claim 1 wherein creating a transmission schedule by assigning data items to be transmitted, by a computing device, to specific times for transmission over the long-range wireless network interface, the assignment of each data item to its specific time being based on the deadline and urgency rating of the data item further comprises:

adding, by a computing device, a stretch factor to each time slot, to account for projected downtime of the long-range wireless network interface.

6. The method of claim 1 wherein responsive to no network interface with a lower cost of use than the long-range wireless network interface being available, transmitting, by a computing device, data items between the mobile communication device and remote computing devices, according to the transmission schedule, such that no data item is transmitted prior to occurrence of the time to which the data item is assigned further comprises:

monitoring the current time, by a computing device;

comparing the current time to time slots in the transmission schedule, by a communication device;

responsive to a fixed-length bundle being assigned to be transmitted at the current time, transmitting, by a computing device, the assigned bundle over the long-range wireless network interface.

7. The method of claim 1 wherein responsive to a network interface with a lower cost of use than the long-range wireless network interface being available, transmitting, by a computing device, data items over the lower cost network interface further comprises:

detecting, by a computing device, that the intermittent lower cost network interface is available; and transmitting, by a computing device, fixed-length bundles over the intermittent lower cost network interface, based on positions of the fixed-length bundles in the transmission schedule, until the intermittent lower cost network interface is no longer available, such that fixed-length bundles are transmitted regardless of occurrence of the time slots to which the fixed-length bundles are assigned.

8. The method of claim 1 wherein responsive to a network interface with a lower cost of use than the long-range wireless network interface being available, transmitting, by a computing device, data items over the lower cost network interface further comprises:

detecting, by a computing device, that a wired network interface is available; and transmitting, by a computing device, fixed-length bundles over the wired network interface, based on positions of the fixed-length bundles in the transmission schedule, until the wired network interface is no longer available, such that fixed-length bundles are transmitted regardless of occurrence of the time slots to which the fixed-length bundles are assigned.

9. At least one non-transitory computer readable medium embedded with a computer executable program for scheduling data communication for a mobile communication device with at least one intermittent lower cost network interface and at least one long-range wireless network interface, the computer executable program including instructions for:

receiving, by a computing device, requests to communicate data items between the mobile communication device and remote computing devices, each data item having an associated deadline and an associated urgency rating;

creating a transmission schedule by assigning data items to be transmitted, by a computing device, to specific times for transmission over the long-range wireless network interface, the assignment of each data item to its specific time being based on the deadline and urgency rating of the data item, wherein creating the transmission schedule by assigning data items to be transmitted to specific times for transmission over the long-range wireless network interface further comprises 1) dividing, by a computing device, each data item to be transmitted into at least one fixed-length bundle, and 2) assigning, by a computing device, each fixed-length bundle to a specific time slot for transmission;

responsive to no network interface with a lower cost of use than the long-range wireless network interface being available, transmitting, by a computing device, data items between the mobile communication device and remote computing devices, according to the transmission schedule, such that no data item is transmitted prior to occurrence of the time to which the data item is assigned; and responsive to a network interface with a lower cost of use than the long-range wireless network interface being available, transmitting, by a computing device, data items over the lower cost network interface.

10. The at least one non-transitory computer readable medium embedded with a computer executable program of claim 9 wherein transmitting a data item, by a computing device, further comprises performing at least one step from a group of steps consisting of:

transmitting, by the mobile communication device, a data item from the mobile communication device to a remote computing device; and transmitting, by a proxy computing device, a data item originating from a remote computing device from the proxy computing device to the mobile communication device.

11. The at least one non-transitory computer readable medium embedded with a computer executable program of claim 9 wherein dividing, by a computing device, each data item to be transmitted into at least one fixed-length bundle further comprises:

dividing, by a computing device, at least one data item to be transmitted into a plurality of fixed-length bundles; and padding, by a communication device, a last one of the plurality of fixed-length bundles, such that the last one of the plurality of fixed-length bundles conforms to the fixed-length.

12. The at least one non-transitory computer readable medium embedded with a computer executable program of claim 9 wherein creating a transmission schedule by assigning data items to be transmitted, by a computing device, to specific times for transmission over the long-range wireless network interface, the assignment of each data item to its specific time being based on the deadline and urgency rating of the data item further comprises:

assuming, by a computing device, a specific maximum amount of transmission time to transmit a fixed-length bundle on the long-range wireless network interface; and assigning, by a computing device, each fixed-length bundle to a specific time slot for transmission according to the assumed, specific maximum amount of transmission time, thereby ensuring that the transmission of each fixed-sized bundle completes within is time slot.

13. The at least one non-transitory computer readable medium embedded with a computer executable program of claim 9 wherein creating a transmission schedule by assigning data items to be transmitted, by a computing device, to specific times for transmission over the long-range wireless network interface, the assignment of each data item to its specific time being based on the deadline and urgency rating of the data item further comprises:

adding, by a computing device, a stretch factor to each time slot, to account for projected downtime of the long-range wireless network interface.

14. The at least one non-transitory computer readable medium embedded with a computer executable program of claim 9 wherein responsive to no network interface with a lower cost of use than the long-range wireless network interface being available, transmitting, by a computing device, data items between the mobile communication device and remote computing devices, according to the transmission schedule, such that no data item is transmitted prior to occurrence of the time to which the data item is assigned further comprises:

monitoring the current time, by a computing device;

comparing the current time to time slots in the transmission schedule, by a communication device;

responsive to a fixed-length bundle being assigned to be transmitted at the current time, transmitting, by a computing device, the assigned bundle over the long-range wireless network interface.

15. The at least one non-transitory computer readable medium embedded with a computer executable program of claim 9 wherein responsive to a network interface with a lower cost of use than the long-range wireless network interface being available, transmitting, by a computing device, data items over the lower cost network interface further comprises:

detecting, by a computing device, that the intermittent lower cost network interface is available; and transmitting, by a computing device, fixed-length bundles over the intermittent lower cost network interface, based on positions of the fixed-length bundles in the transmission schedule, until the intermittent lower cost network interface is no longer available, such that fixed-length bundles are transmitted regardless of occurrence of the time slots to which the fixed-length bundles are assigned.

16. The at least one non-transitory computer readable medium embedded with a computer executable program of claim 9 wherein responsive to a network interface with a lower cost of use than the long-range wireless network interface being available, transmitting, by a computing device, data items over the lower cost network interface further comprises:

detecting, by a computing device, that a wired network interface is available; and transmitting, by a computing device, fixed-length bundles over the wired network interface, based on positions of the fixed-length bundles in the transmission schedule, until the wired network interface is no longer available, such that fixed-length bundles are transmitted regardless of occurrence of the time slots to which the fixed-length bundles are assigned.

17. A computing device configured for scheduling data communications for a mobile communication device with at least a short-range wireless network interface and a long-range wireless network interface, the computing device comprising:
- a processor;
- system memory;
- at least one storage medium;
- at least one long-range wireless network interface;
- at least one intermittent lower cost network interface;
- a clock;
- a request receiving component, configured for receiving requests to transmit data items between the mobile communication device and remote computing devices, each data item having an associated deadline and an associated urgency rating;
- a schedule creating component, configured for creating a transmission schedule by assigning data items to be transmitted to specific times for transmission over the long-range wireless network interface, the assignment of each data item to its specific time being based on the deadline and urgency rating of the data item, wherein creating the transmission schedule by assigning data items to be transmitted to specific times for transmission over the long-range wireless network interface further comprises 1) dividing, by a computing device, each data item to be transmitted into at least one fixed-length bundle, and 2) assigning, by a computing device, each fixed-length bundle to a specific time slot for transmission; and
- a transmitting component, configured to transmit data items between the mobile communication device and remote computing devices, according to the transmission schedule, such that no data item is transmitted prior to occurrence of the time to which the data item is assigned, responsive to no network interface with a lower cost of use than the long-range wireless network interface being available, and configured to transmit data items over a network interface with a lower cost of use than the long-range wireless network interface.

18. The computing device of claim 17 wherein the transmitting component is further configured to transmit data items by performing at least one step from a group of steps consisting of:
- transmitting data items from the mobile communication device to a remote computing device; and
- transmitting data items originating from remote computing devices from a proxy computing device to the mobile communication device.

* * * * *